UNITED STATES PATENT OFFICE.

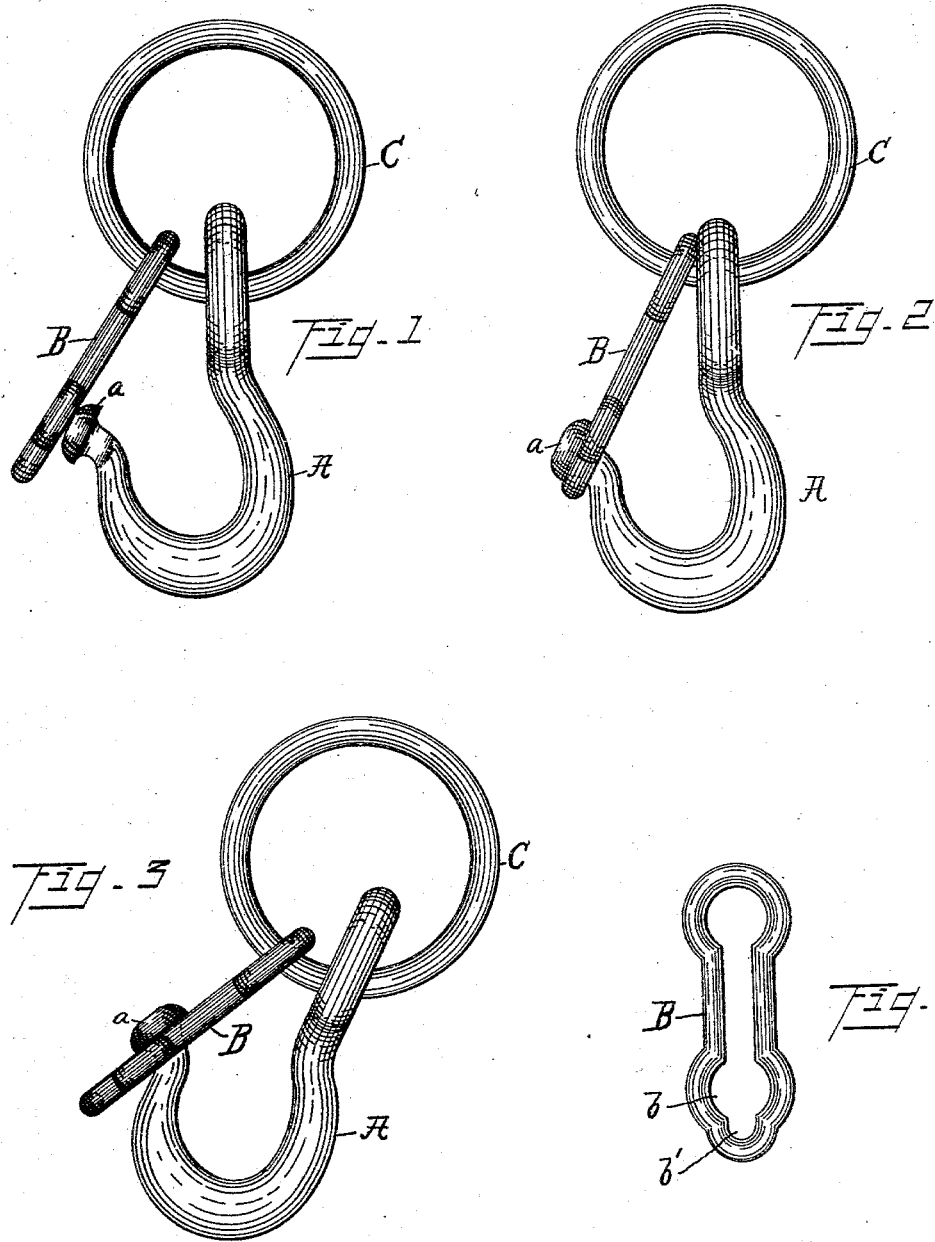

HENRY F. LYMAN, OF CLEVELAND, OHIO.

SAFETY-HOOK.

SPECIFICATION forming part of Letters Patent No. 553,123, dated January 14, 1896.

Application filed August 2, 1895. Serial No. 557,943. (No model.)

*To all whom it may concern:*

Be it known that I, HENRY F. LYMAN, a citizen of the United States, residing at Cleveland, in the county of Cuyahoga and State of Ohio, have invented certain new and useful Improvements in Safety-Hooks; and I do hereby declare the following to be a full, clear, and exact description of the invention, such as will enable others skilled in the art to which it appertains to make and use the same.

This invention relates to safety-hooks for suspending loads of various kinds, and it is particularly adapted for use with hoisting-tackles.

The object of the invention is to provide and combine together a hook having its point enlarged laterally and a link of peculiar construction, whereby, although said parts may quickly and easily be caused to interlock and thus strengthen the hook and prevent the removal of whatever may be suspended therefrom, they cannot be accidentally unlocked and disengaged.

The invention consists in the construction and combination of the parts hereinafter described and claimed.

In the drawings, Figure 1 is a view of the device, showing it unlocked and in position for locking. Fig. 2 is a view of the device locked. Fig. 3 is a view of the device in a swinging position, and Fig. 4 is a detached view of the locking-link.

Referring to the parts by letter, A represents a hook which is loosely suspended upon a ring C, which may be of the form shown or of any other suitable construction and form. On the point of the hook is an enlargement $a$. This enlargement must be a lateral enlargement, and it may be and preferably is in the form substantially of a button, larger than the hook in diameter and secured centrally thereto. A link B is also loosely suspended upon the ring C. The opening in the link is enlarged at one point, $b$, which enlargement is of substantially the shape of but a trifle larger than the enlarged end of the hook, whereby the said end of the hook may be passed through said enlargement, but with little space to spare. Above and below the enlargement $b$ the opening in the link is contracted to a width which is slightly greater than the diameter of the hook directly behind the end $a$, although not so great as the lateral diameter of said end $a$. There is therefore only one position, as shown in Fig. 1, to which the link and hook may be brought in which the end $a$ of the hook may be passed through the opening in the link, either to engage or disengage said parts. When the parts are engaged and they hang in the position they will naturally assume in supporting a load, as shown in Fig. 2, the hook lies in the contracted part $b'$ of the opening in the link. When the parts occupy the described relative position, the link cannot be disengaged from the hook, and moreover it adds its strength to the strength of the hook and prevents the spreading of the hook.

If the hook and link get to swinging upon the ring, they may assume the relative position shown in Fig. 3, in which position they cannot be disengaged. In moving from this position to that shown in Fig. 2 and back again the enlarged end of the hook may pass and repass the enlarged part $b$ of the opening in the link through which alone it can pass; but unless said parts should chance to come to rest in the position shown in Fig. 1 they cannot be disengaged, and will not probably become disengaged even then unless some external force is applied to effect this result.

Having described my invention, I claim—

The combination of a ring and a hook suspended therefrom and having a laterally enlarged point, with a link suspended from said ring having an opening which is enlarged at one point to fit and admit the passage of said enlarged point, and which is contracted above and below said enlargement, substantially as and for the purpose specified.

In testimony whereof I affix my signature in presence of two witnesses.

HENRY F. LYMAN.

Witnesses:
GEO. B. MARTY,
NELLIE SNAVELY.